March 2, 1926. 1,574,950
W. R. WADE
METHOD AND MECHANISM FOR DEHYDRATING MINERALS
Filed March 28, 1923
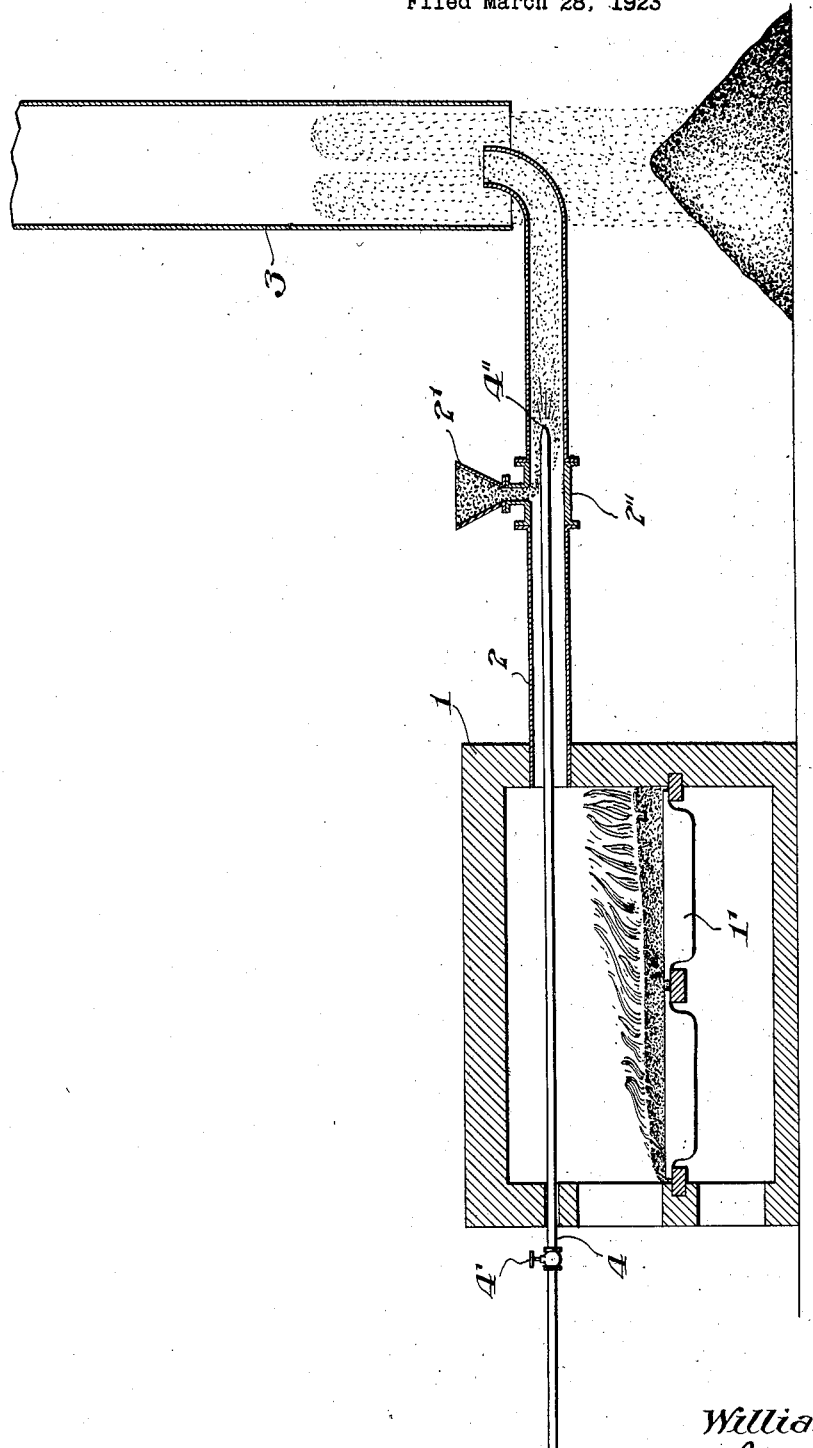
Inventor:
William R. Wade,
By Butler + Denny
Attorneys.

Patented Mar. 2, 1926.

UNITED STATES PATENT OFFICE.

WILLIAM R. WADE, OF EDWARDS, NEW YORK, ASSIGNOR, BY MESNE ASSIGNMENTS, OF ONE-HALF TO NEW YORK ZINC CO., INC., OF EDWARDS, NEW YORK, A CORPORATION OF NEW YORK.

METHOD AND MECHANISM FOR DEHYDRATING MINERALS.

Application filed March 28, 1923. Serial No. 628,185.

*To all whom it may concern:*

Be it known that I, WILLIAM R. WADE, a citizen of the United States, residing at Edwards, St. Lawrence County, New York, have invented a new and useful Method and Mechanism for Dehydrating Minerals, of which the following is a specification.

This invention is designed primarily for dehydrating minerals such for example as zinc ore-pyrite concentrates. It comprises, in its preferred application, the operations of delivering compressed air by a conduit through a combustion chamber and into a hot gas flue of a furnace whereby the air is heated, delivering the materials to be dehydrated into the flue, carrying the materials by the blast through the flue into a stack with coincident dehydration by means of the mixture of hot air with gas, and depositing the dehydrated material from the gas or mixed gas and air expanded in the stack.

Economical, efficient and rapid dehydration is effected thereby.

The accompanying drawing is a sectional elevation in illustration of a form of mechanism adapted for the practice of my invention.

As shown in the drawing, a furnace 1 is connected by a flue and induction pipe 2 with the open bottom of a stack 3 of substantially larger cross-section than the pipe, the inlet end of the pipe being connected with the furnace combustion chamber above the grate 1' therein and the outlet end of such pipe being turned up so that the contents thereof shall be delivered upwardly in the stack. A hopper 2' is connected with the pipe 2 midway of its length and delivers the wet materials in a regular manner into the section 2'' thereof.

A compressed air pipe 4, provided with a regulating valve 4', extends through the combustion chamber of the furnace 1 and into the pipe 2 to a termination in a nozzle 4'' beyond the place of delivery of the wet materials from the hopper 2'.

The compressed air flowing through the pipe 4, under control of the valve 4', is heated by the gases in the furnace chamber and its flue through which such gases together with the air mixed therewith flow to the stack, where the mixture of air and gas expand. The mineral matter, such as ore that will pass through a half inch diameter ring, is disseminated in and carried by the hot blast through the pipe 2 and upwardly in the stack 3. The moisture is thus transferred from the wet materials to the gases or mixed air and gases, the resulting dry material falling from the gases as they expand in the stack and collecting in a heap below such stack and the gases passing off through the top of the stack.

Having described my invention, I claim:

1. The method of dehydrating mineral substances which comprises feeding them into a furnace flue communicating with a combustion chamber and containing hot gases of combustion and delivering a blast of air into said flue.

2. The method of dehydrating mineral substances which consists in delivering air under pressure to a furnace flue, heating said air by means of the gases in said furnace and flue, delivering the mixture of air and gases from the flue to the stack, feeding the substances to be dehydrated into said flue, dehydrating said substances and carrying them from said flue upwardly in the stack by means of the blast, and depositing said substances from said gases or mixture of air and gases by expansion in said flue.

3. The mechanism for dehydrating mineral substances which comprises the combination with a combustion chamber and a flue through which products of combustion in said chamber are discharged and having means for feeding said substances thereto, of a blast pipe for delivering a blast in said flue at a point removed from the feeding inlet.

4. The mechanism for dehydrating mineral substances which comprises the combination with a furnace combustion chamber, a stack and an induction pipe connecting said chamber with said stack, of means for feeding said substances into said induction pipe, and a blast pipe passing through said chamber into said induction pipe to an outlet removed from the point of delivery of said substances.

5. The mechanism for dehydrating mineral substances which comprises the combination with a furnace combustion chamber, a stack having an open bottom, and an induction pipe leading from said chamber and discharging upwardly in said stack, of means for feeding said substances into said pipe and means for delivering a hot blast in said pipe between the place of delivery of said substances thereto and said stack.

6. The method of dehydrating mineral substances which comprises exposing them in comminuted form to the action of flue gases of a temperature and for a period sufficient to dehydrate without roasting said substances, said substances being drawn into said flue gases by suction created by a blast of air discharged into the flue gases at a point removed from the inlet of the mineral substances, and said flue gases and blast discharging to and expanding in a vertical stack with resulting deposition of the mineral below said stack by gravity.

7. The method of dehydrating mineral substances which comprises dispersing said substances, in comminuted form, by means of an air blast, in horizontally moving flue gases of a temperature and for a period sufficient to dehydrate said substances, and effecting deposition of the dehydrated substances by vertically diverting and expanding the flue gases.

In testimony whereof I have hereunto set my name this 23rd day of March, 1923.

WILLIAM R. WADE.